(12) United States Patent
Renac et al.

(10) Patent No.: US 10,819,792 B2
(45) Date of Patent: Oct. 27, 2020

(54) DEVICE AND METHOD FOR EXTRACTING DATA FROM A COMMUNICATION BUS OF A MOTOR VEHICLE

(71) Applicant: Orange, Paris (FR)

(72) Inventors: Paul Renac, Rospez (FR); Pierre Escrieut, Pechbusque (FR)

(73) Assignee: ORANGE, Paris (FR)

( * ) Notice: Subject to any disclaimer, the term of this patent is extended or adjusted under 35 U.S.C. 154(b) by 13 days.

(21) Appl. No.: 14/408,248

(22) PCT Filed: Jun. 14, 2013

(86) PCT No.: PCT/FR2013/051399
§ 371 (c)(1),
(2) Date: Dec. 15, 2014

(87) PCT Pub. No.: WO2013/186504
PCT Pub. Date: Dec. 19, 2013

(65) Prior Publication Data
US 2015/0244806 A1 Aug. 27, 2015

(30) Foreign Application Priority Data
Jun. 15, 2012 (FR) ...................................... 12 55606

(51) Int. Cl.
*H04L 29/08* (2006.01)
*G06F 16/25* (2019.01)
(Continued)

(52) U.S. Cl.
CPC ............ *H04L 67/12* (2013.01); *G06F 13/385* (2013.01); *G06F 16/254* (2019.01); *H04L 67/06* (2013.01); *H04L 67/42* (2013.01)

(58) Field of Classification Search
CPC ......... H04L 67/12; H04L 67/06; H04L 67/42; G06F 13/385; G06F 17/30563
(Continued)

(56) References Cited

U.S. PATENT DOCUMENTS

| 6,356,823 B1 * | 3/2002 | Iannotti | ............. H04L 12/40032 369/21 |
| 8,751,098 B2 * | 6/2014 | Faus | ...................... G07C 5/008 701/29.1 |

(Continued)

FOREIGN PATENT DOCUMENTS

CN 102436259 A 5/2012

OTHER PUBLICATIONS

French Search Report and Written Opinion dated May 22, 2013 for corresponding French Patent Application No. 1255606, filed Jun. 15, 2012.
(Continued)

*Primary Examiner* — Jerry B Dennison
(74) *Attorney, Agent, or Firm* — David D. Brush; Westman, Champlin & Koehler, P.A.

(57) ABSTRACT

A method is provided for extracting at least one usable data item flowing on a communication bus of a machine. The at least one usable data item is representative of a parameter of the machine, The method includes the following steps: receiving a configuration file including information relating to the coding of the at least one usable data item to be extracted; analyzing the information contained in the configuration file in order to enable the identification of the at least one usable data item to be extracted from all the data flowing on the communication bus; collecting the identified at least one usable data item; transmitting the collected at least one usable data item to a server that is remote from the machine.

13 Claims, 3 Drawing Sheets

(51) Int. Cl.
*G06F 13/38* (2006.01)
*H04L 29/06* (2006.01)

(58) Field of Classification Search
USPC .......................................................... 709/203
See application file for complete search history.

(56) References Cited

U.S. PATENT DOCUMENTS

| | | | | |
|---|---|---|---|---|
| 2002/0078173 A1* | 6/2002 | Horn | ..................... | G05B 15/02 709/218 |
| 2008/0238642 A1* | 10/2008 | Mauti | ..................... | G08G 1/205 340/438 |
| 2009/0240472 A1* | 9/2009 | Winnebeck | ........ | G05B 23/0283 702/184 |
| 2010/0180003 A1* | 7/2010 | Jiang | ..................... | G06Q 10/06 709/208 |
| 2010/0260102 A1* | 10/2010 | Liu | ........................ | H04L 1/1657 370/328 |
| 2011/0022442 A1* | 1/2011 | Wellman | ................ | G06Q 10/06 705/7.36 |
| 2011/0071725 A1* | 3/2011 | Kleve | .................. | H04L 67/125 701/31.4 |
| 2011/0188520 A1* | 8/2011 | Newald | ................. | H04L 12/417 370/503 |
| 2012/0041636 A1* | 2/2012 | Johnson | ................ | G07C 5/008 701/31.4 |
| 2012/0046981 A1* | 2/2012 | Wellman | ................ | G05B 15/02 705/7.12 |
| 2013/0145349 A1* | 6/2013 | Basak | ................. | G06F 9/44505 717/121 |
| 2013/0159586 A1* | 6/2013 | Kessler | ................... | G06F 13/38 710/305 |
| 2013/0201316 A1* | 8/2013 | Binder | .................... | H04L 67/12 348/77 |
| 2013/0321627 A1* | 12/2013 | Turn, Jr. | ................ | B60W 30/00 348/148 |
| 2013/0325907 A1* | 12/2013 | Montes de Oca | .......................... | G06F 17/30914 707/811 |
| 2013/0339721 A1* | 12/2013 | Yasuda | .................. | G07C 5/008 713/100 |
| 2014/0025253 A1* | 1/2014 | Rybak | .................. | G07C 5/0858 701/32.7 |
| 2015/0066239 A1* | 3/2015 | Mabuchi | ............. | H04L 63/1408 701/1 |
| 2015/0124597 A1* | 5/2015 | Mabuchi | ............... | H04L 12/413 370/230 |
| 2015/0195297 A1* | 7/2015 | Ben Noon | ............ | B60R 16/023 726/22 |
| 2015/0244806 A1* | 8/2015 | Renac | ..................... | H04L 67/06 709/203 |
| 2019/0228596 A1* | 7/2019 | Mondello | ............... | H04L 12/40 |

OTHER PUBLICATIONS

International Search Report dated Sep. 13, 2013 for corresponding International Patent Application No. PCT/FR2013/051399, filed Jun. 14, 2013.
English translation of the Written Opinion dated Dec. 15, 2014 for corresponding International Patent Application No. PCT/FR2013/051399, filed Jun. 14, 2013.
English Translation of the Chinese Office Action dated Oct. 8, 2016 for corresponding Chinese Application No. 201380031617.3.
English Translation of the Chinese Office Action dated May 18, 2017 for corresponding Chinese Application No. 201380031617.3.

* cited by examiner

FIG. 2

DEVICE AND METHOD FOR EXTRACTING DATA FROM A COMMUNICATION BUS OF A MOTOR VEHICLE

CROSS-REFERENCE TO RELATED APPLICATIONS

This Application is a Section 371 National Stage Application of International Application No. PCT/FR2013/051399, filed Jun. 14, 2013, which is incorporated by reference in its entirety and published as WO 2013/186504 A1 on Dec. 19, 2013, not in English.

GENERAL TECHNICAL FIELD

The present invention relates to the technical field of systems and methods allowing extraction and processing of data transmitted over a communication bus of a machine—such as a series system bus of the CAN (Control Area Network) type of a vehicle.

GENERAL PRESENTATION OF THE PRIOR ART

Electronic computers integrated and used in a motor vehicle (engine computer, braking computer, etc. . . . ) are interconnected together through a communication network or bus.

In practice, a plurality of computers of the vehicle are connected to a same communication bus and transmit information over this communication bus in turn. This allows limitation of the amount of communication cables used in a vehicle.

At the present time, the majority of motor vehicles use the same technology for exchanging information between these onboard computers: the CAN ("Control Area Network") bus.

The CAN bus is an industrial network technology (also called an "in-the-field" technology) and by its technology, it meets the constraints of the environment of an automobile as regards reliability of the data exchanges in a perturbed environment.

However, at the present time, the "applicative" portion—i.e. the format, the coding and the meaning of the data transported over a CAN bus—is not standardized, so that each designer of the engineering and architecture of onboard electronic systems in automobiles, proposes a format, a coding, and a meaning different for a same datum.

For example, if a datum representative of the displacement speed of a vehicle is considered:
for a first vehicle model, this data will be:
 transmitted on frame no. 1 of the CAN bus,
 called "speed",
 coded on four bytes,
 expressed in meters per second, while
for a second vehicle model, this datum will be:
 transmitted on frame no. 12 of the CAN bus,
 designated as "vel.",
 coded on two bytes,
 expressed in kilometers per hour.

Thus the coding of the data transported by a CAN bus—a coding usually called "CAN messaging"—is proper and specific to each manufacturer and to each vehicle model.

The lack of standardization of CAN messaging forces the providers of telematics solutions to develop specific software solutions per vehicle model.

Moreover, the amount of data circulating on CAN messaging systems is increasingly significant because of the increasing number of onboard computers in a vehicle. Therefore it becomes very difficult to extract the whole of the information circulating on the CAN bus and to transmit this whole information to a distant server. This forces the providers of telematics solutions to develop specific software solutions depending on the final targeted application.

It is thus understood that the development of software solutions is lengthy and costly because of the multiplicity of vehicle models on the one hand and of the multiplicity of final applications on the other hand.

There exists a need for proposing a device and a method for extracting data giving the possibility of facilitating development of generic software solutions intended for machines including a communication bus, while limiting the amount of extracted data from this bus.

PRESENTATION OF THE INVENTION

The invention fits this need by proposing a method for extracting at least one useful datum circulating on a communication bus of a machine, said at least one useful datum being representative of a parameter of the machine, the method comprising the following steps:
 receiving a configuration file including information relating to the coding of said at least one useful datum to be extracted,
 analyzing pieces of information contained in the configuration file so as to allow identification of said at least one useful datum to be extracted from the whole of data circulating on the communication bus,
 collecting said at least one identified useful datum,
 transmitting said at least one collected useful datum to a remote server of the machine.

The applications of such a method notably relate to:
 fleet management services
 services of the "pay as you drive" type, for insurances, or further
 self-sharing services for vehicles (thermal, electric vehicles, . . . )

More broadly, all the worldwide actors of automotive transports may benefit from ultimate automotive applications based on "machine to machine communications" (or "M2M"), such as for example remote diagnostic services of the vehicle, etc.

The reception and analysis of a configuration file allow automatic adaptation of the collecting step. Indeed:
 instead of a collecting step dedicated to a single format for coding the data, the invention proposes the application of a configurable collecting step depending on the coding format of the data circulating on the communications bus:
 this allows adaptation of the extraction method to any vehicle model;
 instead of a set extraction step only allowing the extraction of a predetermined set of data, the invention proposes the application of an extraction step in which the nature of the data to be extracted is parameterized,
 this allows adaptation of the extraction method to any type of final targeted application;
 instead of an undifferentiated extraction step allowing extraction of the set of data circulating on the communications bus, the invention proposes the application of a selective extraction step wherein the number of data to be extracted is adjustable; this allows limitation of the amount of extracted data and transmitted to the server.

Thus, the combination of the reception, analysis, collection and transmission steps give the possibility of obtaining a generic data extraction method (i.e. which may be used regardless of the coding format, the number and the nature of the data to be extracted) and wherein the amount of extracted data is limited to the needs of the final targeted application.

Preferred but non-limiting aspects of the system according to the invention are the following:
- the analysis step comprises the acquisition of a frequency for collecting said at least one useful datum, the collecting step comprising the collecting of said at least one useful datum at said collecting frequency,
- this allows limitation of the amount of useful data collected for the needs of the final targeted application and therefore optimization of the use of the hardware resources of the machine (memory space required for storing the data, band width associated with the communications between the machine and the remote server, etc);
- the analysis step comprises the acquisition of a conversion factor of said at least one useful datum, the collecting step comprising the application of said conversion factor to said at least one useful datum for converting said datum into a predetermined unit representative of a physical quantity,
- this allows transmission to the remote server, of homogeneous useful data in units regardless of the type of machine on which the extraction method is applied;
- the analysis step comprises the acquisition of a criterion for validating said at least one useful datum, the collecting step comprising the comparison of said useful datum with the validation criterion,
- this gives the possibility of only transmitting to the remote server plausible values of useful data and thus optimizing the use of the band width between the machine and the server while avoiding congestion of the latter by transmission of erroneous data;
- the analysis step comprises:
  - acquiting a plurality of initial parameters for the configuration of the collecting step, and
  - storing said initial parameters in a local memory location this gives the possibility of having in the machine, pieces of information required for extracting useful data, and therefore optimizing the use of the hardware resources on the one hand and accelerating the processing rate of the extraction method on the one hand, notably by avoiding that the machine searches for these pieces of information in a memory of the remote server;
- the method further comprises the reception of a new configuration file for updating the configuration of the collecting step, and analysis of the new configuration file, the step for data collection from the initial configuration file being executed and in parallel with the step for analyzing the new configuration file, this gives the possibility of dynamic adaptation of the extraction method according to the time-dependent changes in the needs of the final targeted application.

The invention also relates to a method for generating a configuration file for parameterizing a method for extracting at least one useful datum circulating on a communication bus of a machine, said at least one useful datum being representative of a parameter of the machine, the generation method comprising a step for creating the configuration file from a file of extractable data circulating on the communication bus, said step for creating the configuration file comprising the selection of said at least one useful datum to be extracted from the whole of the extractable data from the file of extractable data.

The method for generating a configuration file gives the possibility:
- of making the extraction method compatible with any type of machine,
- of limiting the amount of extracted data according to the final targeted application.

In an embodiment of the generation method, the selection step comprises:
- the selection of said at least one useful datum to be extracted from the whole of the extractable data of the extractable data file, and
- ascribing to said at least one selected useful datum homogenization criteria for standardizing the coding format of said at least one selected useful datum.

This allows standardization of the coding format of the data transmitted to the remote server.

The invention also relates to a device for extracting at least one useful datum circulating on a communication bus of a machine, said at least one useful datum being representative of a parameter of the machine, the device being able to apply the following modules:
- receiving a configuration file including information relating to the coding of said at least one useful datum to be extracted,
- analyzing the information contained in the configuration file in order to allow identification of said at least one useful datum to be extracted from among the whole of the data circulating on the communication bus,
- collecting said at least one identified useful datum,
- transmitting said at least one collected useful datum to a remote server of the machine.

Advantageously, the extraction device comprises means for applying, independently or as a combination, the different aspects of the extraction method described above.

The invention also relates to a communication casing, able to be connected to the communication bus of a machine, the communication casing comprising an extraction device as described above.

The invention also relates to a server for generating a configuration file for parameterizing a device for extracting at least one useful datum circulating on a communication bus of a machine, said at least one useful datum being representative of a parameter of the machine, characterized in that the server comprises a programmable processing unit for applying, independently or as a combination, the steps of the generation method described above.

The fact that the method for generating a configuration file is applied on a remote server allows limitation of the amount of hardware resources onboard the machine for applying the invention. Indeed, the steps for analyzing the file of extractable data, for selecting the useful data to be extracted, etc. are costly in processing time and in processing resources. Their application in the remote server allows limitation of the size of the memory module, etc. to the minimum required for applying the extraction method.

In an embodiment, the server comprises a transducer for transmitting the generated configuration file to the extraction device.

The invention also relates to a system for extracting at least one useful datum circulating on a communication bus of a machine, this useful datum being representative of a parameter of the machine, the system comprising:

a communication casing connected to the communication bus, said casing being compliant with the communication casing described above, and a server compliant with the generation server described above.

The invention also relates to a computer program product including instructions for applying the steps of the extraction method described above when it is executed by a processor. Such a program may use any programming language. It may be downloaded from a communications network and/or recorded on a computer-legible medium.

The invention also relates to a storage medium which is legible by a processor, either integrated or not to the file generation server according to the invention, optionally removable, storing in memory a computer program applying a generation method as described earlier.

The invention further relates to a computer program product including instructions for applying the steps of a generation method as described earlier, when this program is executed by a processor. Such a program may use any programming language. It may be downloaded from a communications network and/or recorded on a computer-legible medium.

The invention also relates to a storage medium, legible by a processor, either integrated or not to the extraction device according to the invention, optionally removable, storing in memory a computer program applying a generation method as described earlier.

PRESENTATION OF THE FIGURES

Other features and advantages of the invention will further become apparent from the description which follows, which is purely illustrative and non-limiting and should be read with reference to the appended drawings, wherein.

DESCRIPTION OF EMBODIMENTS OF THE INVENTION

The invention will now be described in more detail with reference to the figures, in the particular case of a "CAN" (Controller Area Network) bus of a motor vehicle. In these different figures, equivalent elements bear the same numerical references.

1. Extraction Method

Figure 1:
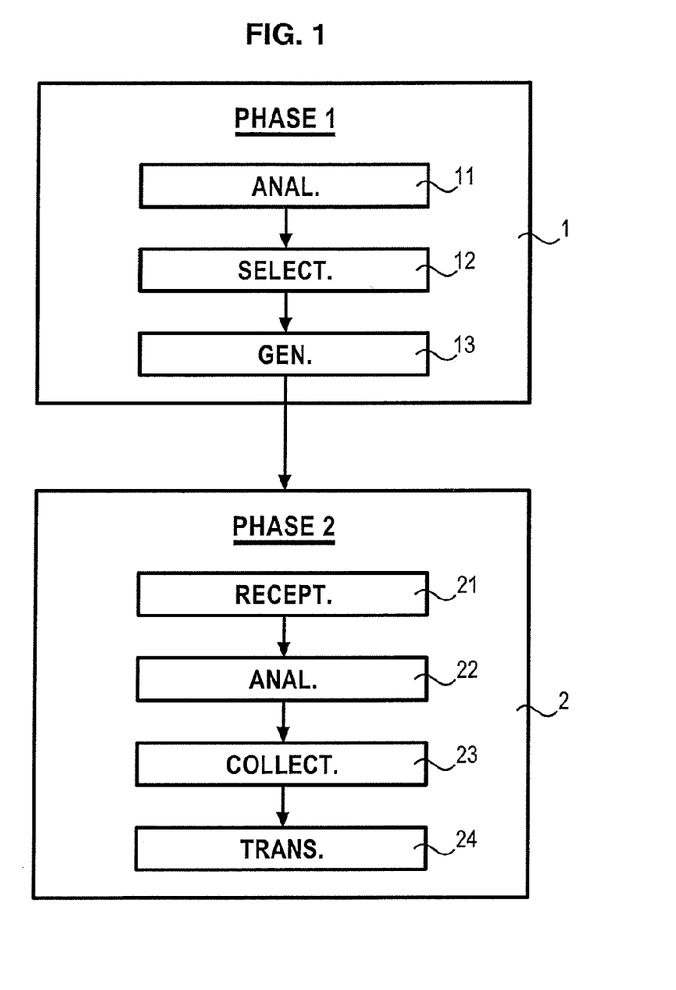
FIG. 1 schematically illustrates an exemplary method for extracting data.

With reference to FIG. 1, an exemplary method for extracting data circulating on a communication bus of the CAN type is illustrated.

The method comprises:

a so-called "offline" phase 1, and a so-called "online" phase 2.

The "offline" phase 1 allows configuration of the file of data to be extracted by the extraction method, depending on the model of the vehicle and on the final targeted application.

The "online" phase 2 allows extraction of the useful data to the final targeted application. Both of these phases will be described in more detail subsequently.

1.1. Offline Phase

The "offline" phase comprises:

a step 11 for analyzing the data circulating on the communication bus; this step gives the possibility of creating a file of extractable data, a step 12 for selecting in the file of extractable data, useful data from among the plurality of contained extractable data; this step allows creation of a file of data to be extracted, a step 13 for generating from the file of data to be extracted, a configuration file for parameterizing the extraction method.

1.1.1. Analysis Step

As explained earlier, each vehicle has its own data format for structuring and coding the parameters of the vehicle—such as the displacement speed of a vehicle, the amount of fuel contained in the reservoir, etc.—in frames circulating on the communication bus.

The transmission to a server of raw data circulating on the communication bus would require an extremely tedious processing at the server.

The step for analyzing the data circulating on the bus allows limitation of the hardware or software resources required for processing the data circulating on the communication bus.

The coding format of the data circulating on the communication bus may either be known or not.

When the coding format is known, the latter may be defined in different forms. Notably, the coding format used for a given vehicle may be defined in the form of a data structure stored in memory.

Alternatively, the coding format used may be defined in the form of a descriptor file:

with the format ".SYM" a proprietary format of the corporation Peak-system, or with the format ".DBC", a proprietary format of the corporation "Vector".

In this case, the analysis step may comprise an automatic semantic analysis of the descriptor file. Semantic analysis gives the possibility of interpreting the contents of the descriptor file in order to produce pieces of information allowing identification of the data contained in the flow of frames circulating on the CAN bus.

For each datum representative of a parameter of the vehicle, semantic analysis allows definition of:

an identifier of the frame which transports the datum, of pointer(s) of this datum in said frame, of a length of a field used for coding this datum, of a read mask of the datum, of an offset, etc.

When the coding format of the data circulating on the communication bus is unknown, the analysis step may consist of varying the various parameters of the vehicle one after the other, and of observing—optionally by means of a network analyzer—the variations of the data in the frame circulating on the communication bus.

For example, during the opening of a door of the vehicle (the other vehicle parameters remaining constant), if data contained in the identifier frame 28 vary, the representative datum of the opening of the door is then contained in this identifier frame 28. By repeating these operations for each parameter of the vehicle (displacement speed, etc), it is possible to define the coding format of the data associated with each of the parameters of the vehicle.

In every case, the analysis step allows production of a file of extractable data consisting of a set of values contained in a table which may be stored in memory in different binary data structure forms (data in memory, file, database).

1.1.2 Selection Step

As described above, the amount of data circulating on the communication bus of a motor vehicle is so substantial that it is costly or even unnecessary to extract the totality of these data.

Indeed, extraction and transmission to a remote server of the totality of the data circulating on a communication bus may induce:
- saturation of the communication channel allowing transmission of the extracted data, notably in the case when the communication channel is a network with limited throughput,
- a significant cost of communications through the communication channel, notably in the case when the communication channel is a mobile network,
- congestion of the server because of the substantial number of data to be stored and to be processed.

The step for selecting useful data in the file of extractable data allows limitation of the amount of data to be extracted depending on the final targeted application.

The selection step may comprise a step for selecting data to be extracted from among the plurality of extractable data, as well as a step for ascribing collecting criteria to each of the data to be extracted.

1.1.2.1. Selection Step

The step for selecting the data to be extracted allows definition of a group of data to be extracted. This group of data to be extracted corresponds to a subset contained in the group of extractable data, which limits the amount of data being transmitted to the server.

The selection step may be manual. Notably, the selection step may be carried out by a user via a man/machine interface allowing the user to pick out one or several data to be extracted from the whole of the extractable data of the file of extractable data.

Alternatively, the selection step may be automatic or controlled.

1.1.2.2. Assignment Step

The assignment step allows standardization of the coding format of the useful data selected during the selection step. It consists of ascribing various criteria to each of the selected useful data. These criteria are for example:
- a single denomination giving the possibility of explicitly designating, in a single and homogeneous way the relevant useful datum regardless of the vehicle model;
- for example, the designation "engine speed" will be ascribed to the useful datum representative of the speed of rotation of the engine, their denomination "speed" will be ascribed to the useful datum representative of the displacement speed of the vehicle, etc,
- a unit conversion factor for restoring the useful datum in a single and homogeneous unit;
- for example, a conversion factor is applied to the useful datum associated with the displacement speed of the vehicle for expressing it in kilometers/h and not in meters/s or in miles/h, a conversion factor is applied to the useful datum associated with the consumption of the vehicle for expressing it in liters/100 km and not in $mm^3/s$ or $\mu l/s$ etc,
- a periodicity of reading the useful datum on the communication bus: this periodicity gives the possibility of adapting the collecting frequency of a datum according to the final targeted application, and thus limit the amount of extracted data; for example, a periodicity of 1/N may be applied to a useful datum in order to only extract one value every N values of this useful datum,
- a criterion for validating the value illustrated by the useful datum: this criterion gives the possibility of ascribing validity conditions of the value of each acquired parameter;
- for example, the validity criterion may correspond to minimum and maximum threshold values for a useful datum associated with a temperature, etc.

The assignment step may be automatic or manual. In this case, it may be carried out by a user via a man/machine interface allowing the latter to ascribe criteria to each useful datum.

In every case, the selection step gives the possibility of obtaining a file of data to be extracted consisting of a group of useful data for applying the final targeted application. This group of useful data forms a subset of the group of extractable data contained in the file of extractable data.

1.1.3. Generation Step

The generation step gives the possibility of producing a configuration and file for extracting useful data during the "online" phase.

Advantageously, the configuration file may comprise fields relating to:
- its name,
- its version,
- its creation date,
- the number of useful data to be extracted, etc.

With this additional information contained in the configuration file, it is notably possible to remotely update the extraction method.

The format of the other information contained in the configuration file may be identical with the format of the information contained in the file of data to be extracted.

The configuration file is then used during the "online" phase for allowing extraction of the useful data or applying the tie to the final application.

1.2. Online Phase

The "online" phase 2 comprises:
- a step 21 for receiving the configuration file,
- the analysis 22 of the configuration file for configuring (or updating) a collecting operation of the useful data on the CAN bus,
- the collection 23 of the useful data circulating on the CAN bus,
- the transmission 24 of the collected useful data.

1.2.1. Receiving the Configuration File

The first step of the "online" phase consists of receiving the configuration file generated during the "offline" phase. This allows automatic adaptation of the data extraction method.

Thus, instead of software development of the extraction methods specific to each vehicle model and each final targeted application, the extraction method according to the invention makes use of the pieces of information contained in the configuration file for allowing its parameterization depending on:
- the vehicle model on which it is applied, and
- on the final targeted application.

1.2.2. Analysis of the Configuration File

Another step of the online phase consists of analyzing the information contained in the received configuration file.

This analysis consists of obtaining criteria and conditions for collecting the useful data from information of the configuration file. Notably, the analysis step may comprise the following processing operations:

identifying each useful datum to be collected,
determining collecting rules associated with each useful datum; notably:
  determining the optional data acquisition periodicity criterion on the CAN bus (i.e. collecting a value of the useful datum considered every N values), and/or
  determining the conversion factor of the value associated with the relevant useful datum for converting this value into a desired unit (i.e. kilometers, liter, etc),
  determining validity conditions of the value associated with the relevant useful datum (for example, the value should be greater than a minimum threshold value) or should be less than a maximum threshold value, or should be comprised between a minimum threshold value and a maximum threshold value, etc).

The analysis of the configuration file allows parameterization of the extraction step of the extraction method.

1.2.3. Extraction of the Useful Data

Once the extraction method is parameterized, a step for collecting the useful data is carried out. The frames circulating on the communication bus are examined and the data which they contain are collected when they correspond to a useful datum of the configuration file and the collection criteria relating to this useful datum are met.

For example, for an "average speed" application computing the average speed of a vehicle during a path, the configuration file may comprise a piece of information relating to the collection of the useful datum corresponding to the "displacement speed of the vehicle". In this case, the configuration file may also specify:
  the collecting periodicity of this datum,
  the conversion factor of the values associated with this datum,
  the validity criterion of this datum,
  the denomination to be associated with this datum,
  the identifier of the frame containing this datum, etc.

The extraction step then consists of:
  observing the data frames circulating on the communication bus,
  for each current frame circulating on the bus, comparing the identifier indicated in the configuration file with the identifier of the current frame,
  if the identifiers are identical:
    implementing a counter,
    comparing the value of the counter with the connecting periodicity value indicated in the configuration file,
    if these values are identical:
      collecting the datum contained in the frame; and
      resetting the counter to zero,
      returning to the observation step,
    if these values are different:
      not collecting the datum, and
      returning to the observation step.
  If the identifiers are different:
    returning to the observation step.

The collection of a useful datum may also depend on a collecting criterion. For example, for an application consisting of detecting road traffic offenses of vehicles, like excessive speeds of a vehicle, the connection of the useful datum corresponding to the parameter "displacement speed of the vehicle" may only be carried out when the value of the useful datum is greater than a threshold (for example 130 km/h).

One skilled in the art will have understood that the step for collecting useful data is adaptive according to the information contained in the configuration file, which provides great flexibility to the extraction method according to the invention.

1.2.4. Transmission of the Collected Data

Once one or several useful data have been collected, the latter may be transmitted to a remote server for applying the final targeted application.

The transmission of the collected data may be carried out:
  gradually during the collecting, or
  periodically, or
  on demand.

1.2.5. Updating the Configuration File

The method may also comprise a step for updating the configuration file.

This step for updating the configuration file comprises reception of a new configuration file, analysis of the new configuration file and parameterization of the method according to the new configuration file.

Advantageously, parameterization of the method according to the new configuration file may be achieved without requiring any stopping of the data extraction step by the method.

Moreover, parameterization according to the new configuration file may be achieved:
  either upon receiving the new configuration file,
  or subsequently, for example:
    upon receiving a demand ordering the method to apply the parameterization of the method from the new configuration file, or further
    when the value of the collected datum does not meet a particular condition, for example a condition related to passing a predetermined threshold, or further a validity condition of this datum.

2. Extraction Device and System

An extraction system will now be described giving the possibility of applying the extraction method according to the invention.

Figure 2:
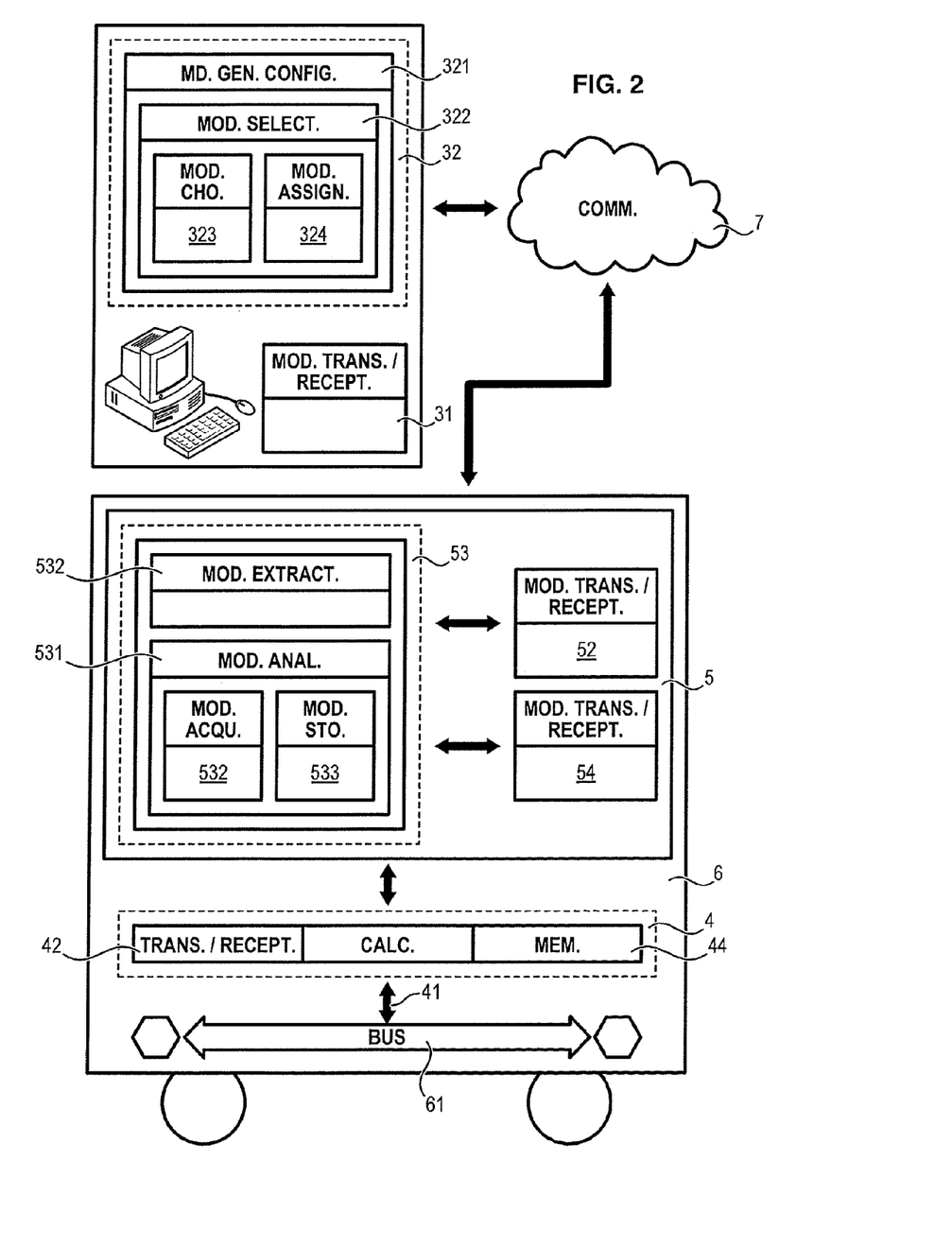
FIGS. 2 and 3 schematically illustrate examples of data extraction systems.
Figure 3:
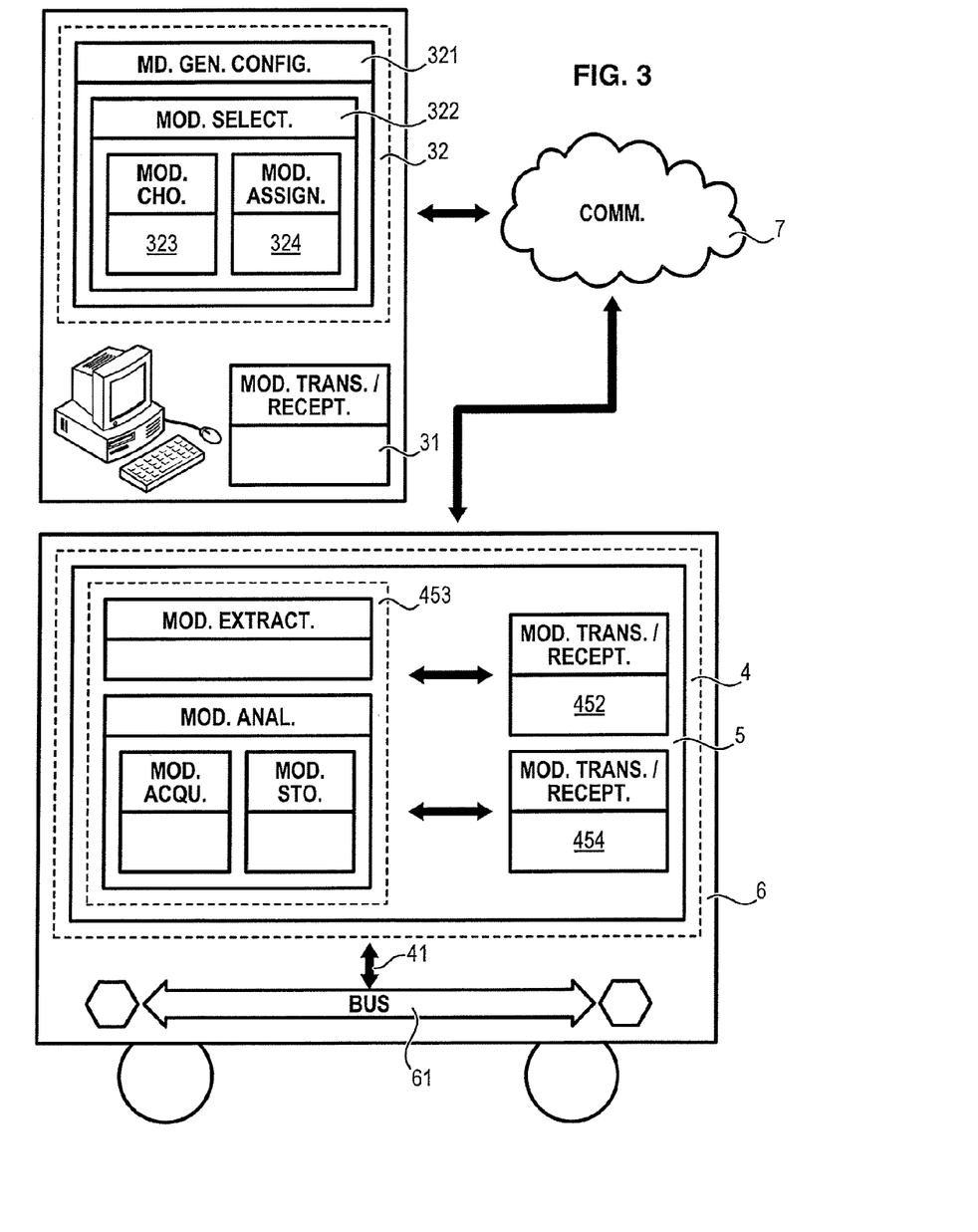

The extraction system comprises a remote server 3 and an extraction device 5 connected or integrated to a communication casing 4 positioned in the vehicle 6. By using an extraction device 5 separate from the communications casing 4 and connected to the latter, it is possible to update existing communication casings present on the vehicles being circulated.

It will be noted that in the case when the extraction device 5 is not integrated to the communications casing 4, it may be connected to the communication casing 4 through any type of connection, such as for example a serial port, an USB port, an I2C bus or further a short range radio connection of the BlueTooth or Zigbee type.

The server 3 is programmed for applying the method for generating a configuration file according to the invention, which corresponds to the offline phase.

Alternatively, this generation step may also be applied by a remote machine other than the server 3. In this case, a first server is responsible for the generation of the configuration file, a second server is responsible for receiving the useful data extracted by the extraction device of the casing 4. In the continuation of the description, a single server 3 is considered.

With the extraction device 5 it is possible to extract useful data for the final targeted application. The extraction device 5 is programmed so as to apply the extraction method of the online phase.

2.1 Server

The server 3 comprises a transducer 31 and a processing unit 32.

The transducer 31 allows transmission of the configuration file to the extraction device 5 and reception of the useful data extracted by the extraction device 5.

The processing unit 32 is programmed so as to apply the steps of the method for generating a configuration file corresponding to the "offline" phase.

For this purpose, the processing unit 32 comprises a module 321 for generating a configuration file. This generation module 321 notably includes a module 322 for selecting useful data to be extracted. The selection module 322 consists of a module 323 for selecting useful data to be extracted, and a module 324 for ascribing homogenization criteria to these selected useful data.

The processing unit 32 for example includes computer(s), microcomputer(s), programmable logic controller(s), or any type of device known to one skilled in the art.

2.2. Extraction Device

With reference to FIG. 2, an embodiment of the extraction system is illustrated in which the extraction device 5 is separate and connected to the communication casing 4.

The extraction device 5 comprises a transmission/reception module 52 allowing communication with the server 3 via a communication network 7.

With the assumption that the communication casing 4 comprises a transducer 42 such as an antenna, the transmitter/receiver module 52 may consist in a programmed communication driver for controlling the transducer 42 of the communication casing 4. This allows limitation of the amount of hardware resources contained in the extraction device 5.

Alternatively, the transmitter/receiver module 52 may comprise a transducer such as an antenna or any type of transducer known to one skilled in the art.

The extraction device 5 also comprises a memory module 54 for storing:

useful data extracted from the communication bus 61,
configuration file(s) and
program code instructions allowing the application of the processing steps of the "online" phase.

With the assumption that the communication casing 4 comprises a suitable memory 44 for storing the extracted useful data, the memory module 54 of the extraction device 5 may comprise a programmed recording driver for accessing the memory 44 of the communication casing 4. In this case, the memory module 54 of the extraction device 5 controls the storage of the configuration file(s) and of the extracted data in a location of the memory 44 of the communication casing 4.

Alternatively, the memory module 54 may comprise a recording medium such as a random access memory ("RAM").

The extraction device 5 finally comprises a programmed computing unit 53 for applying the processing steps of the "online" phase of the extraction method.

The computing unit 53 includes:

an analysis module 531 notably consisting of:
  an acquisition module 532 for acquiring a frequency for collecting the useful datum/data, a conversion factor of the useful datum/data and/or a validity criterion of the useful datum/data
  a storage module 533 for storing the pieces of information acquired by the acquisition module 532, this storage module may be integrated or separate from the memory module 54,
an extraction module 532 for extracting the useful data.

2.3. Communication Casing

With reference to FIG. 3, an embodiment of the extraction system is illustrated in which the extraction device 5 is integrated to the communication casing 4.

The communication casing 4 comprises a connector 41, a transceiver 452, a computer 453 and a memory 454.

The connector 41 allows connection of the casing 4 to the CAN bus 61 of the vehicle 6. As an example, this may be an electric connection either by induction or by an optocoupler.

The transceiver 452 gives the possibility of:
sending the extracted useful data, and
receiving the configuration file(s) transmitted by the server 3.

The computer 453 is programmed so as to apply the processing steps of the "online" phase of the extraction method. Notably, the computer includes the modules of the extraction device illustrated in FIG. 2.

The computer 453 may comprise processor(s) microcontroller(s), micro-computer(s), programmable logic controller(s), integrated circuit(s) specific to the application, or any other type of programmable circuit known to one skilled in the art.

2.4. Memory

The memory 454 allows storage of the program code instructions allowing application of the processing steps of the "online" phase.

It also allows storing of the configuration file(s).

The memory 454 further allows storage of the useful data collected by the communication casing 4.

2.5. Operating Principle 2.5.1. Server Side

The operating principle of the system illustrated in FIG. 3 is the following.

The server 3 receives a descriptor file via a communication network to which it is connected or further any storage means, for example a USB stick. This descriptor file comprises information on the coding format of the data circulating on the communication bus 61 of the vehicle 6.

Optionally, the server 3 may also receive pieces of information relating to the final targeted application for which extraction of data is required.

The processing unit 31 performs a semantic analysis of the pieces of information contained in the descriptor file and generates a file of extractable data.

From the file of extractable data, the server 3 generates a file of useful data to be extracted by:

selecting from among the whole of the extractable data, the useful data for the final targeted application, and by associating extraction criteria with these useful data.

Finally, the processing unit 31 of the server 3 produces the configuration file from the file of useful data to be extracted.

Once the configuration data file is generated, the latter is transmitted—preferably by wireless communication 7—to the casing 4 positioned in the vehicle 6.

2.5.2. Casing Side 2.5.2.1. Reception of the Configuration File

The casing 4 receives the configuration file via the transceiver 452. The reception of the configuration file may be applied at any moment depending on a selected downloading procedure.

For example, the reception of a configuration file may occur upon powering the casing 4 therefore at each start of the vehicle 6.

Alternatively, the reception of a configuration file may occur during operation of the casing 4, for example at every update of the configuration file by the server 3.

Moreover, the reception of a configuration file may be conditioned or not by sending to the server 3 a request for loading by the casing 4.

2.5.2.2. Storage of the Configuration File in a Memory

Upon receiving the configuration file, the casing 4 stores the latter in its memory 454.

If an old configuration file is already recorded in the memory 454 of the casing 4, while the casing 4 may advantageously store the new configuration file in another location of the memory, without erasing the old configuration file.

The taking into account of the new configuration file may be immediately effective after its reception.

The taking into account of a new configuration file may also be deferred over time. For example, in certain alternative embodiments, a new configuration file may be taken into account upon receiving control information from the server 3, from a controller of the vehicle 6 or from a remote terminal other than the server 3.

In other alternative embodiments, a new configuration file may be taken into account when the value of a datum collected on the communication bus is greater (less respectively) than a threshold value contained in the old configuration file.

In every case, this taking into account of the new configuration file may be accomplished without any interruption of the step for extracting data by the casing 4. This allows dynamic adaptation of the data extraction step by the casing 4.

2.5.2.3. Analysis of the Configuration File

The casing 4 extracts criteria and collecting conditions from the configuration files stored in memory:
  identification of each useful datum to be extracted,
  recovery of the acquisition periodicity criterion associated with each useful datum to be extracted,
  storing in memory the coefficient or the computing rule to be applied on the collected useful datum,
  acquisition of the validity conditions of the useful datum to be extracted.

Once the analysis is completed, the casing 4 collects the useful data to be extracted.

2.5.2.4. Collecting the Useful Data

The casing 4 receives frames circulating on the CAN bus and compares them with the whole of the pieces of information obtained during the analysis of the configuration file.

The casing 4 extracts the useful data from the whole of the frame circulating on the CAN bus. The extracted data are transmitted to the server or are optionally stored in memory before their being sent.

CONCLUSION

The extraction method and the extraction system described above have many advantages. Notably, the whole of the processing achieved during the online phase is unique and common to all the vehicle models, independently of the final targeted application. It is inferred therefrom that the casing allowing the application of this phase online is not specific to a particular vehicle model but maybe adapted to any vehicle brand without requiring particular adaptation.

Moreover, the application of the offline phase at a remote server allows limitation of the amount of hardware resources required at the casing.

Finally, the use of a configuration file for parameterizing the extraction of the useful data allows great adaptability of the extraction method and of the associated system.

As a conclusion, the extraction method described and its associated system give the possibility:
  of making the processing of the "online" phase applied by the casing, adaptable to each vehicle model without having to again develop specific (software) processing: the step for collecting the sought useful data in the flow of data is adaptive according to the type of vehicle,
  of making the processing of the "online" phase applied by the casing, adaptable to each final application without having to again develop specific (software) processing: the step for collecting the sought useful data in the flow of data is adaptive according to the parameters required for executing the final application,
  of dynamically updating the extraction method without interrupting the step for collecting the useful data,
  of restoring the sought parameters with standard units regardless of the format and coding of the "raw" data circulating on the communication bus of the vehicle,
  of collecting the sought useful data with a specific, single and configurable periodicity for each of the useful data to be extracted, the collecting frequency for a datum being able to be remotely modified without interrupting the collecting step.

One skilled in the art will have understood that many modifications may be made to the method and to the system according to the invention without materially departing from the novel teachings presented here.

For example, the extraction method and its associated system may be used for collecting data on types of communication buses other than the CAN bus, such as for example buses of the LIN, Flex-Ray, NMEA and NMEA2000 type, or further alternatives of the CAN bus (FMS bus/J1939 standard, ODB standard, etc).

Moreover, the extraction method may not comprise the processing steps of the offline phase, notably in the case when the configuration file is directly provided by the automobile manufacturer.

It is therefore quite obvious that the examples which have just been given are only particular illustrations and by no means limiting.

In particular, the invention is not limited to the extraction of the data transmitted through communication buses of the automotive field. Communication buses may be used in other fields, for example those of industrial robotics, aeronautics or further marine transportation.

REFERENCES

1: Offline phase
2: Online phase
11: Analysis of data circulating on the bus,
12: Selection of useful data for the final targeted application,
13: Generation of a configuration file,
21: Receiving the configuration file,
22: Analysis of the configuration file,
23: Collecting the useful data,
24: Transmission of the collected useful data.

The invention claimed is:

1. A method for extracting a datum circulating on a communication bus of a machine, said datum being representative of a parameter of the machine, comprising:
  receiving a configuration file including information relating to a coding of said datum to be extracted,
  analyzing information contained in the configuration file for allowing identification of said datum to be extracted from the whole of data circulating on the communication bus, wherein analyzing comprises acquiring a validity criterion of said datum and a rate of collecting data circulating on the communication bus, only when an identified datum from the whole of data circulating on the communication bus satisfies said validity criterion, collecting said identified datum from the communication bus at said rate of collecting data, standardizing a coding format of said identified datum using homogenization criteria, and transmitting said collected and standardized datum to a remote server of the machine.

2. The extraction method according to claim 1, wherein the analyzing act comprises acquisition of a conversion factor of said datum, and wherein the standardizing act comprises applying said conversion factor to said datum in order to convert said datum into a predetermined unit representative of a physical quantity.

3. The extraction method according to claim 1, wherein the analyzing act comprises:
acquiring a plurality of initial parameters for configuring the collecting act, and
storing said initial parameters in a local memory location.

4. The extraction method according to claim 3, which further comprises reception of a new configuration file for updating the configuration of the collecting act, and analyzing the new configuration file, the data collecting act from the initial configuration file being executed in parallel with the act of analyzing the new configuration file.

5. A method for generating a configuration file for parameterizing an extraction method for at least one datum circulating on a communication bus of a machine, said at least one datum being representative of a parameter of the machine, wherein the generation method comprises the following acts:
creating the configuration file from a file of extractable data circulating on the communication bus, said act of creating the configuration file comprising:
selecting said at least one datum to be extracted from the whole of the extractable data of the extractable data file;
ascribing to said at least one selected datum homogenization criteria for standardizing a coding format of said at least one selected datum when the selected datum is collected from the communication bus and a validity criterion to be satisfied by the datum circulating on the communication bus to be collected; and
assigning a rate of collecting the datum from a series of the datum circulating on the communication bus.

6. A device for extracting a datum circulating on a communication bus of a machine, said datum being representative of a parameter of the machine, wherein the device comprises:
a non-transitory computer-readable medium comprising instructions stored thereon;
a processor configured by the instructions to perform acts comprising:
receiving a configuration file including information relating to a coding of said datum to be extracted,
analyzing the information contained in the configuration file for allowing identification of said datum to be extracted from the whole of data circulating on the communication bus, wherein analyzing comprises acquiring a validity criterion of said datum and a rate of collecting data circulating on the communication bus,
only when an identified datum from the whole of data circulating on the communication bus satisfies said validity criterion, collecting said identified datum from the communication bus at said rate of collecting data,
standardizing a coding format of said collected datum using homogenization criteria; and
transmitting said collected and standardized datum to a remote server of the machine.

7. A communication casing, able to be connected to a communication bus of a machine, wherein the casing comprises:
an extraction device for extracting at least one datum circulating on a communication bus of a machine, said at least one datum being representative of a parameter of the machine, wherein the device comprises:
a non-transitory computer-readable medium comprising instructions stored thereon;
a processor configured by the instructions to perform acts comprising:
receiving a configuration file including information relating to a coding of said at least one datum to be extracted,
analyzing the information contained in the configuration file for allowing identification of said at least one datum to be extracted from the whole of data circulating on the communication bus, wherein analyzing comprises acquiring a validity criterion of said at least one datum and a rate of collecting data circulating on the communication bus,
only when an identified datum from the whole of data circulating on the communication bus satisfies said validity criterion, collecting said at least one identified datum from the communication bus at said rate of collecting data circulating on the communication bus, and
standardizing a coding format of said collected datum using homogenization criteria; and
transmitting said at least one collected and standardized datum to a remote server of the machine.

8. A server for generating a configuration file for parameterizing a device for extracting at least one datum circulating on a communication bus of a machine, said at least one datum being representative of a parameter of the machine, wherein the server comprises:
a non-transitory computer-readable medium comprising instructions stored thereon;
a processor configured by the instructions to perform acts comprising:
generating a configuration file for parameterizing an extraction method for at least one datum circulating on a communication bus of a machine, said at least one datum being representative of a parameter of the machine, wherein generating comprises creating the configuration file from a file of extractable data circulating on the communication bus, comprising:
selecting said at least one datum to be extracted from the whole of the extractable data of the extractable data file; and
ascribing to said at least one selected datum homogenization criteria for standardizing a coding format of said at least one selected datum when the selected datum is collected from the communication bus and a validity criterion to be satisfied by the datum circulating on the communication bus to be collected; and
assigning a rate of collecting the datum from a series of the datum circulating on the communication bus.

9. The server according to claim 8, which further comprises a transducer for transmitting the generated configuration file to an extraction device.

10. A system for extracting at least one datum circulating on a communication bus of a machine, each datum being representative of a parameter of the machine, wherein the system comprises:
- a communication casing connected to the communication bus, said casing being configured to be connected to the communication bus of a machine, wherein the casing comprises an extraction device for extracting at least one datum circulating on a communication bus of a machine, said at least one datum being representative of a parameter of the machine, wherein the extraction device comprises:
  - a non-transitory computer-readable medium comprising instructions stored thereon;
  - a processor configured by the instructions to perform acts comprising:
    - receiving a configuration file including information relating to a coding of said at least one datum to be extracted,
    - analyzing the information contained in the configuration file for allowing identification of said at least one datum to be extracted from the whole of data circulating on the communication bus, wherein analyzing comprises acquiring a validity criterion of said at least one datum and a rate of collecting data circulating on the communication bus,
    - only when an identified datum from the whole of data circulating on the communication bus satisfies said validity criterion, collecting said at least one identified datum from the communication bus at said rate of collecting data circulating on the communication bus,
    - standardizing a coding format of said identified datum using homogenization criteria; and
    - transmitting said at least one collected and standardized datum to a remote server of the machine; and,
- a server for generating a configuration file for parameterizing the extraction device, wherein the server comprises:
  - a non-transitory computer-readable medium comprising instructions stored thereon;
  - a processor configured by the instructions to perform acts comprising:
    - generating a configuration file for parameterizing an extraction method for said at least one datum circulating on the communication bus of the machine, wherein generating comprises creating the configuration file from a file of extractable data circulating on the communication bus, comprising:
      - selecting said at least one datum to be extracted from the whole of the extractable data of the extractable data file;
      - ascribing to said at least one selected datum the homogenization criteria for altering and standardizing a coding format of said at least one selected datum when the selected datum is collected from the communication bus; and
      - assigning a rate of collecting the datum from a series of the datum circulating on the communication bus.

11. A non-transitory computer-readable medium comprising a computer program product recorded thereon and including instructions for applying acts of an extraction method for extracting at least one datum circulating on a communication bus of a machine, said at least one datum being representative of a parameter of the machine, wherein the method comprises:
- receiving a configuration file including information relating to a coding of said at least one datum to be extracted
- analyzing information contained in the configuration file for allowing identification of said at least one datum to be extracted from the whole of data circulating on the communication bus, wherein analyzing comprises acquiring a validity criterion of said at least one datum and a rate of collecting data circulating on the communication bus,
- only when an identified datum from the whole of data circulating on the communication bus satisfies said validity criterion, collecting said at least one identified datum from the communication bus at said rate of collecting data circulating on the communication bus,
- standardizing a coding format of said collected datum using a homogenization criteria; and
- transmitting said at least one collected datum to a remote server of the machine, when it is executed by a processor.

12. A non-transitory computer-readable medium comprising a computer program product recorded thereon and including instructions for applying acts of a generation method for generating a configuration file for parameterizing an extraction method for at least one datum circulating on a communication bus of a machine, said at least one datum being representative of a parameter of the machine, wherein the generation method comprises creating the configuration file from a file of extractable data circulating on the communication bus, wherein creating comprises selecting said at least one datum to be extracted from the whole of the extractable data of the extractable data file, ascribing to said at least one selected datum homogenization criteria for altering and standardizing a coding format of said at least one selected datum when the selected datum is collected from the communication bus and a validity criterion to be satisfied by the datum circulating on the communication bus to be collected, when the instructions are executed by a processor, and assigning a rate of collecting the datum from a series of the datum circulating on the communication bus.

13. A method for generating a configuration file for parameterizing an extraction method according to claim 1, for extracting at least one datum circulating on a communication bus of a machine, said at least one datum being representative of a parameter of the machine, wherein the generation method comprises the following acts:
- creating the configuration file from a file of extractable data circulating on the communication bus, said act of creating the configuration file comprising
  - selecting said at least one datum to be extracted from the whole of the extractable data of the extractable data file;
  - ascribing to said at least one selected datum the homogenization criteria for standardizing a coding format of said at least one selected datum when the selected datum is collected from the communication bus and said validity criterion to be verified by data to be extracted; and
  - assigning a rate of collecting the datum from a series of the datum circulating on the communication bus.

* * * * *